June 4, 1940.  T. CASINELLO  2,203,189

MOP

Filed Oct. 26, 1938

Tony Casinello,
INVENTOR

BY Victor J. Evans & Co.
ATTORNEYS

Patented June 4, 1940

2,203,189

UNITED STATES PATENT OFFICE 2,203,189

MOP

Tony Casinello, Detroit, Mich.

Application October 26, 1938, Serial No. 237,126

3 Claims. (Cl. 306—30)

My invention relates to improvements in mops and more particularly to the clamping means associated therewith.

One of the principal objects of my invention is to provide a mop construction equipped with means for reliably clamping the mopping or cleaning element thereto and which is readily operable to effect replacement of said element.

Another object of my invention is to provide a mop construction of the character described which is simple in construction, durable in use, efficient in operation, and economical in manufacture.

Other objects and advantages will be apparent from the following description, appended claims and annexed drawing.

Referring to the drawing wherein like reference characters designate like parts throughout the several views.

Figure 1:
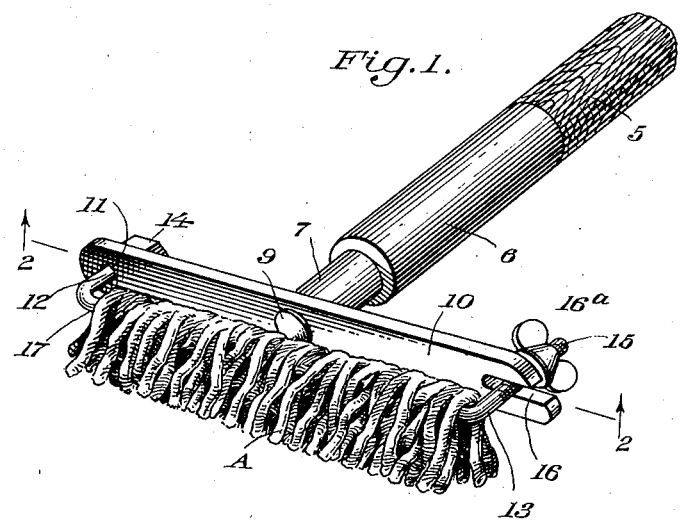
Figure 1 is a perspective view of my invention.
Figure 2:
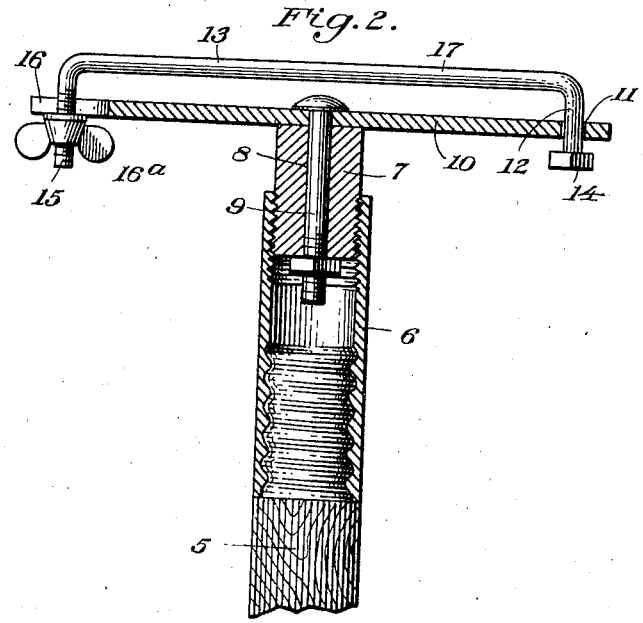
Figure 2 is a detail sectional view taken on the line 2—2 of Figure 1.
Figure 3:
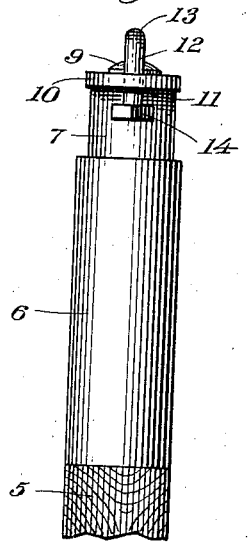
Figure 3 is an end elevation thereof.

My novel form of mop construction comprises the usual handle 5 on the lower end of which is detachably threaded the upper end of a sleeve 6, the lower end of which is interiorly threaded and secures therein the upper threaded end of a stud 7, the latter being provided with a longitudinally extending bore 8 in which is secured a bolt 9. The lower or headed end of said bolt extends through an elongated plate 10 and secures said plate fixed to the lower end of the stud, it being understood that the head of said bolt engages the under face of the plate 10 and that the opposite end of said bolt has threaded thereon a nut engaging the upper end of the stud 7 whereby to securely maintain the plate 10 in connected relation with the stud as clearly illustrated in Figure 2.

The plate 10 constitutes a part of a clamping device and one end of said plate is formed with a transverse opening 11 through which extends a right angularly disposed end section 12 of a rod or bolt 13. Said end section 12 is provided with a head 14 disposed adjacent the upper face of the plate 10. The opposite end of the rod 13 is likewise angularly disposed and provides a threaded end section 15 which extends through a slot 16 formed longitudinally in the opposite end of the plate. The end section 15 is provided with a wing nut 16a on the outer end thereof for engagement with the upper face of the plate 10 whereby to effect adjustment of the rod relative to the plate.

In use, a mop or cleaning element A is folded over the lengthwise extending section 17 of the rod and the wing nut 16a operated to clamp said element between the rod 13 and the plate 10.

From the foregoing it will be apparent that by loosening the wing nut 16a the mop element may be readily removed therefrom for repairing, replacement or other purposes and that the clamp may be readily disengaged from the sleeve 6 by detachment of the stud 7 from said sleeve.

It is to be distinctly understood that various changes and modifications may be resorted to in the construction and arrangement of the parts without departing from the spirit of the invention or scope of the appended claims.

What I claim is:

1. Means of attaching an article to a handle, comprising, a plate for carrying said article, a stud having one end engaging said plate and the other end provided with threads, a sleeve having one end threadedly connected to the threaded end of said stud and the opposite end threaded for connection with the end of a handle, a bolt extending through said plate and stud and having its headed end engaging said plate and its threaded end disposed within said sleeve, and a nut mounted on said threaded end of the bolt and coacting with the latter to secure said plate to said stud.

2. Means of attaching a mop clamp to a handle, comprising, a sleeve adapted to be connected to the handle, with a portion thereof extending forwardly beyond the handle, the projecting portion of the sleeve being internally screw threaded, a stud extending centrally from the mop clamp, said stud being screw threaded and engaged in the projecting portion of the sleeve, a bolt extending through said clamp and stud, and a nut carried by the bolt and disposed within the sleeve for connecting the clamp to said stud through the medium of the bolt.

3. Means of attaching a mop clamp to a handle, comprising, a sleeve adapted to be connected to the handle with a portion thereof extending forwardly beyond the handle, the projecting portion of the sleeve being internally screw threaded, a stud extending centrally from the mop clamp, said stud being screw threaded and engaged in the projecting portion of the sleeve, a bolt extending through said clamp and stud and having its headed end engaging said clamp and its threaded end disposed within said sleeve, and a nut mounted on said threaded end of the bolt and coacting with the latter to secure the clamp to the stud.

TONY CASINELLO.